(12) United States Patent
Mas et al.

(10) Patent No.: US 11,104,778 B2
(45) Date of Patent: Aug. 31, 2021

(54) TALC PARTICULATE AND USES THEREOF

(71) Applicant: Imerys Talc Europe, Toulouse (FR)

(72) Inventors: Jean-Sebastien Mas, Luzenac (FR); Jerome Crepin-Leblond, Colomiers (FR)

(73) Assignee: IMERTEC SAS, Paris (FR)

(*) Notice: Subject to any disclaimer, the term of this patent is extended or adjusted under 35 U.S.C. 154(b) by 0 days.

(21) Appl. No.: 15/507,535

(22) PCT Filed: Aug. 25, 2015

(86) PCT No.: PCT/EP2015/069429
§ 371 (c)(1),
(2) Date: Feb. 28, 2017

(87) PCT Pub. No.: WO2016/034455
PCT Pub. Date: Mar. 10, 2016

(65) Prior Publication Data
US 2017/0283578 A1    Oct. 5, 2017

(30) Foreign Application Priority Data
Sep. 1, 2014  (EP) .................................... 14290261

(51) Int. Cl.
| | | |
|---|---|---|
| C08K 3/34 | (2006.01) | |
| C01B 33/22 | (2006.01) | |
| C09C 1/28 | (2006.01) | |
| C08K 9/04 | (2006.01) | |
| C08K 9/00 | (2006.01) | |

(52) U.S. Cl.
CPC .............. C08K 3/34 (2013.01); C01B 33/22 (2013.01); C08K 3/346 (2013.01); C08K 9/00 (2013.01); C08K 9/04 (2013.01); C09C 1/28 (2013.01); *C01P 2002/22* (2013.01); *C01P 2004/51* (2013.01); *C01P 2004/54* (2013.01); *C01P 2004/61* (2013.01); *C01P 2004/62* (2013.01); *C01P 2006/12* (2013.01); *C08K 2201/003* (2013.01); *C08K 2201/005* (2013.01); *C08K 2201/006* (2013.01); *C08K 2201/016* (2013.01)

(58) Field of Classification Search
CPC .. C01B 33/22; C01P 2004/61; C01P 2004/62; C01P 2006/12
See application file for complete search history.

(56) References Cited

U.S. PATENT DOCUMENTS

| | | | |
|---|---|---|---|
| 4,391,733 A | 7/1983 | Lamar et al. | |
| 4,504,617 A | 3/1985 | Yui et al. | |
| 5,576,617 A | 11/1996 | Webb et al. | |
| 6,348,536 B1* | 2/2002 | Fourty ..................... | C08K 3/34 106/415 |
| 2013/0028042 A1 | 1/2013 | Pruett et al. | |

FOREIGN PATENT DOCUMENTS

| | | |
|---|---|---|
| CN | 101679673 A | 3/2010 |
| DE | 69806364 | 8/2002 |
| EP | 2628775 | 8/2013 |
| EP | 2410007 | 6/2014 |
| EP | 2623550 | 7/2014 |
| EP | 2 770 029 A1 | 8/2014 |
| WO | WO 2000/059841 | 10/2000 |
| WO | WO 2002/16511 A1 | 2/2002 |
| WO | WO 2004/016697 A2 | 2/2004 |
| WO | WO 2004/061014 A1 | 7/2004 |
| WO | WO2008135529 | 11/2008 |
| WO | WO2013015841 | 1/2013 |
| WO | WO 2014/053498 A1 | 4/2014 |
| WO | WO 2014/057273 A1 | 4/2014 |
| WO | WO-2014057273 A1 * | 4/2014 ........... C01B 33/425 |
| WO | WO2014128072 | 8/2014 |

OTHER PUBLICATIONS

International Search Report and Written Opinion dated Sep. 21, 2015, in International PCT Application No. PCT/EP2015/069429, filed Aug. 25, 2015.
Gantenbein, D. et al. "Determining the size distribution-defined aspect ratio of rod-like particles." Applied Clay Science, 2011, vol. 53, 4, pp. 538-543.
Search Report for Brazilian Application No. BR112017003995-8 dated Dec. 12, 2019 (4 pages) and translation (1 page).
High Performance HAR® Talcs for Plastics, IMERYS Talc, Oct. 2011.
Jetfine® Talcs for High Performance Polypropylene and Engineering Thermoplastics, IMERYS Talc, Oct. 2011.
Product Data Sheet Jetfine® 3 C A, IMERYS Talc, Oct. 2011.
Shahid Wahab Khan, Rheological properties of talc-filled polypropylene, Loughborough University, 2001.
Product Data Sheet Jetfine® 3 C A, Luzenac, Nov. 30, 2007.
Product Data Sheet Steamic T1 C A, Luzenac, Nov. 30, 2007.
Product Information Data Sheet Finntalc M03, Mondo Minerals B.V., Jun. 8, 2014.
Stephen A. Nelson, Phyllosilicates (Micas, Chlorite, Talc, & Serpentine), Tulane University, Aug. 18, 2015.
Etzler, Frank M et al., "Particle size analysis: A comparison of various methods II," Particle and Particle Systems Characterization, vol. 14, Dec. 1997, pp. 278-282.
Li, M et al., "Comparison of Particle Size Distributions Measured Using Different Techniques" Particulate Science and Technology: An International Journal, vol. 23, Feb. 24, 2007, pp. 265-284.

(Continued)

*Primary Examiner* — Robert C Boyle
(74) *Attorney, Agent, or Firm* — Finnegan, Henderson, Farabow, Garret & Dunner, LLP

(57) ABSTRACT

There is disclosed a talc particulate having a $d_{50}$ of from about 0.5 to 5.0 µm and comprising less than about 500 ppm of particles having a particle size of equal to or greater than 45 µm and a shape factor equal to or greater than about 40. A process for making the talc particulate is also disclosed. The talc particulate may be used in polymer compositions as a filler from which polymer composites and articles may be formed.

7 Claims, No Drawings

(56) References Cited

OTHER PUBLICATIONS

International Standards Organization, "ISO 9276-6 Representation of results of particle size analysis. Part 6: Descriptive and quantitative representation of particle shape and morphology" International Standards Organization, 2008.
International Standards Organization, "ISO 14411-2:2020(en)—Preparation of particulate reference materials. Part 2: Polydisperse spherical particles" Jan. 9, 2020.
International Standards Organization, "ISO 8336:2017(en) Fibre-cement flat sheets. Product specification and test methods" Jan. 6, 2017.
Current CV of Prof. Dr. Michael Stintz of TU Dresden Jan. 2021.
Opinion by Prof. Dr. Michael Stintz of TU Dresden submitted against EP2906638 Jan. 2021.
DFG, Deutsche Forschungsgemeinschaft, "The MAK-Collection Part 1:MAK Value Documentations, vol. 22" Weinheim: WILEY-VCH Verlag GmbH & Co. KGaA, Jul. 7, 2006 ISBN: 3-527-31135-1.

* cited by examiner

TALC PARTICULATE AND USES THEREOF

CLAIM FOR PRIORITY

This application is a U.S. national phase entry under 35 U.S.C. § 371 from PCT International Application No. PCT/EP2015/069429, filed Aug. 25, 2015, which claims the benefit of priority of EP Application No. 14290261.8, filed Sep. 1, 2014, both of which are incorporated herein by reference.

TECHNICAL FIELD

The present invention is directed to a talc particulate, to polymer compositions comprising said talc particulate, to processes for preparing said talc particulate and polymer composition, to uses of the talc particulate as a filler, and to polymer composites and articles formed from the polymer composition.

BACKGROUND

Talc particulates have been developed to provide stiffness in plastics (and barrier performance for rubber, paper and coatings). Exemplary talc particulates are described in U.S. Pat. No. 6,348,536. It is today mainly used in polypropylene based formulations with a talc content ranging from about 5 to 40 wt. %, based on the total weight of the formulation. It would be desirable to provide new talcs for use in such formulations having new or enhanced physical (e.g., mechanical) properties.

SUMMARY OF THE INVENTION

According to a first aspect of the present invention, there is provided a talc particulate having a $d_{50}$ of from about 0.5 to 5.0 µm and a shape factor equal to or greater than 40, and comprising less than about 500 ppm of particles having a particle size of equal to or greater than 45 µm.

According to a second aspect of the present invention, there is provided a process for preparing a talc particulate having a $d_{50}$ of from about 0.5 to 5.0 µm and a shape factor equal to or greater than 40, and comprising less than about 500 ppm of particles having a particle size of equal to or greater than 45 µm, said process comprising:
  (a) delaminating a liquid suspension of a relatively coarse talc particulate having an initial particle size with a $d_{50}$ of greater than about 5.0 µm, for example, greater than about 7.5 µm, and optionally having a $d_{95}$ of at least about 20.0 µm, to obtain a talc particulate having a particle size less than the initial particle size;
  (b) treating the suspension to reduce or eliminate particles having a $d_{95}$ of greater than about 15.0 µm; and
  (c) at least partially drying the suspension, thereby obtaining a talc particulate having a $d_{50}$ of from about 0.5 to 5.0 µm and a shape factor equal to or greater than 40, and comprising less than about 500 ppm of particles having a particle size of equal to or greater than 45 µm.

DETAILED DESCRIPTION OF THE INVENTION

As used herein, the term "talc" means either the magnesium silicate mineral, or the mineral chlorite (magnesium aluminium silicate), or a mixture of the two, optionally associated with other minerals, for example, dolomite and/or magnesite, or furthermore, synthetic talc, also known as talcose.

As used herein, the term "surface treated" means particles of the talc are contacted with a compound which adheres (e.g., physisorbed or bonded) or is otherwise associated with the surface of the talc.

As used herein, the term "lamellarity index" is defined by the following ratio:

$$\frac{d_{mean} - d_{50}}{d_{50}}$$

in which "$d_{mean}$" is the value of the mean particle size ($d_{50}$) obtained by a particle size measurement by wet Malvern laser scattering (standard AFNOR NFX11-666 or ISO 13329-1) and "$d_{50}$" is the value of the median diameter obtained by sedimentation using a sedigraph (standard AFNOR X11-683 or ISO 13317-3), as described below. Reference may be made to the article by G. Baudet and J. P. Rona, Ind. Min. Mines et Carr. Les techn. June, July 1990, pp 55-61, which shows that this index is correlated to the mean ration of the largest dimension of the particle to its smallest dimension.

"Shape factor", as used herein, is a measure of the ratio of particle diameter to particle thickness for a population of particles of varying size and shape as measured using the electrical conductivity methods, apparatuses, and equations described in U.S. Pat. No. 5,576,617, which is incorporated herein by reference. As the technique for determining shape factor is further described in the '617 patent, the electrical conductivity of a composition of an aqueous suspension of orientated particles under test is measured as the composition flows through a vessel. Measurements of the electrical conductivity are taken along one direction of the vessel and along another direction of the vessel transverse to the first direction. Using the difference between the two conductivity measurements, the shape factor of the particulate material under test is determined.

As used herein, "specific surface area (BET)" means the area of the surface of the particles of the talc particulate with respect to unit mass, determined according to the BET method by the quantity of nitrogen adsorbed on the surface of said particles so to as to form a monomolecular layer completely covering said surface (measurement according to the BET method, AFNOR standard X11-621 and 622 or ISO 9277). In certain embodiments, specific surface is determined in accordance with ISO 9277, or any method equivalent thereto.

Unless otherwise stated, particle size properties referred to herein for the talc particulate materials are as measured in a well known manner by sedimentation of the particulate material in a fully dispersed condition in an aqueous medium using a Sedigraph 5100 machine as supplied by Micromeritics Instruments Corporation, Norcross, Ga., USA (wwvv.micromeritics.com), referred to herein as a "Micromeritics Sedigraph 5100 unit". Such a machine provides measurements and a plot of the cumulative percentage by weight of particles having a size, referred to in the art as the 'equivalent spherical diameter' (e.s.d), less than given e.s.d values. The mean particle size $d_{50}$ is the value determined in this way of the particle e.s.d at which there are 50% by weight of the particles which have an equivalent spherical diameter less than that $d_{50}$ value. The $d_{95}$ value is the value at which 95% by weight of the particles have an esd less than that $d_{95}$ value. Particle size properties may be determined in accordance with ISO 13317-3, or any method equivalent thereto.

In the Malvern laser light scattering technique referred to above, the size of particles in powders, suspensions and emulsions may be measured using the diffraction of a laser beam, based on an application of Mie theory. Such a machine, for example a Malvern Mastersizer S (as supplied by Malvern Instruments) provides measurements and a plot of the cumulative percentage by volume of particles having a size, referred to in the art as the 'equivalent spherical diameter' (e.s.d), less than given e.s.d values. The mean particle size $d_{50}$ is the value determined in this way of the particle e.s.d at which there are 50% by volume of the particles which have an equivalent spherical diameter less than that $d_{50}$ value. For the avoidance of doubt, the measurement of particle size using laser light scattering is not an equivalent method to the sedimentation method referred to above.

As used herein, the term "steepness", is determined by the following formula:

$$\text{steepness}=100\times(d_{30}/d_{70})$$

in which the d30 value is the value at which 30% by weight of the particles have an esd less than that d30 value, and the d70 value is the value at which 70% by weight of the particles have an esd less than that d70 value, as measured in accordance with the sedimentation method described above.

According to certain embodiments, the talc particulate has a $d_{50}$ of from about 0.5 to 5.0 µm and a shape factor equal to or greater than 40, and comprises less than about 500 ppm of particles having a particle size of equal to or greater than 45 µm. In certain embodiments, the ppm of particles having a particle size of equal to or greater than 45 µm is determined by analysis using a screen or sieve with an appropriately sized aperture size, i.e., a screen or sieve having an aperture size of 45 µm, for example, a 45 µm screen available from Controlab™. The analysis may be carried out based on 1 kg of dry talc. For example, for a slurry at 10% solid content, 10 kg of slurry will be weighed and screened, with the residue collected and weighed with a dessicator in to determine the ppm of particles having a particle size of equal to or greater than 45 µm. Unexpectedly, it has been found that by reducing the ppm of particles having a particle size of equal to or greater than 45 µm, for example, to a level less than 500 ppm, for example, to a level less than about 100 ppm, or even equal to or less than 50 ppm, improvements in one or more mechanical properties of polymer compositions filled with the talc particulate may be obtained; for example, impact resistance, as observed on falling weight impact or charpy impact measurements. Further, stiffness, as observed on measuring flexural modulus, can be improved, particularly if the steepness of the talc particulate is increased, as discussed herein.

In certain embodiments, the talc particulate comprises less than about 250 ppm of particles having a particle size of equal to or greater than 45 µm, for example, equal to or less than about 100 ppm, or equal to or less than about 75 ppm, or equal to or less than about 50 ppm, or equal to or less than about 40 ppm, or equal or less than about 30 ppm, or equal to or less than about 20 ppm of particles having a particle size of equal to or greater than 45 µm. In certain embodiments, the talc particulate comprises at least about 1 ppm, for example, at least about 5 ppm, or at least about 10 ppm of particles having a particle size of equal to or greater than 45 µm.

Herein, the reference to an amount of particles in terms of parts per million ("ppm") having a particle size smaller or larger than a certain size is a reference to ppm by weight.

In certain embodiments, the talc particulate has a $d_{50}$ of from about 0.5 to about 4.0 µm, or from about 0.5 to about 3.5 µm, or from about 0.75 to about 3.25 µm, or from about 1.0 to about 3.0 µm, or from about 1.25 to about 3.0 µm, or from about 1.5 to about 3.0 µm, or from about 1.75 to about 3.0 µm, or from about 2.0 to about 2.9 µm, or from about 2.2 to about 2.8 µm, or from about 2.3 to about 2.8 µm.

In certain embodiments, the talc particulate has a $d_{95}$ of less than about 15 µm, for example, a $d_{95}$ of less than about 12 µm, less than about 11 µm, or less than about 10 µm. In certain embodiments, the talc particulate has a $d_{95}$ of from about 5.0 to about 15.0 µm, for example, from about 7.0 to about 12.0 µm, or from about 8.0 to 12.0 µm, or from about 7.0 to about 11.0 µm, or from about 8.0 to about 11.0 µm, or from about 8.0 to about 10.0 µm, or from about 8.0 to about 9.0 µm.

In certain embodiments, the talc particulate has a steepness of at least about 25, for example, at least about 26, or at least about 27, or at least about 28, or at least about 29. Advantageously, the talc particulate has a steepness of at least about 30, for example, at least about 31, or at least about 32, or at least about 33, or at least about 34, or at least about 35, or at least about 36, or at least about 37, or at least about 38. In certain embodiments, the steepness is less than about 50, for example, less than about 45. In certain embodiments, the steepness is from about 29 to 40, for example, from about 30 to 40, or from about 30 to 39, or from about 31 to 38, or from about 32 to 38, or from about 33 to 38, or from about 34 to 38, or from about 34 to 38. As discussed herein, it has unexpectedly been found that increasing the steepness of the talc particulate may favourably improve the stiffness of a polymer composition filled with the talc particulate.

In certain embodiments the talc particulate has a shape factor equal to or greater than 70, for example, equal to or greater than 80 or equal to or greater than 90. In certain embodiments the talc particulate has a shape factor equal to or less than 150, for example equal to or less than 130, for example equal to or less than 110. In certain embodiments the shape factor is from 40 to 150, or 40 to 130 or 40 to 110, or 70 to 150 or 70 to 130 or 70 to 110. A relatively high shape factor may favourably improve the stiffness of a polymer filled with a talc particulate which is additionally characterised in having a d50 of from about 0.5 to 5.0 µm and which comprises less than about 500 ppm of particles having a particle size of equal to or greater than 45 µm.

In certain embodiments, the talc particulate has a lamellarity index of at least about 2.6, for example, at least about 2.8, or at least about 3.0, or at least about 3.2, or at least about 3.4. In certain embodiments, the talc particulate has a lamellarity index of less than about 5.0 or less than or equal to about 4.2, or equal to or less than about 4.0. In certain embodiments, the talc particulate has a lamellarity index of from about 2.8 to about 5.0, for example, from about 2.8 to about 4.5, or from about 2.8 to about 4.0, for example, from about 2.9 to about 4.0, or from about 3.0 to about 4.0, or from about 3.0 to about 2.9, or from about 3.1 to about 3.9, or from about 3.2 to about 3.9, or from about 3.3 to about 3.9. Conventional wisdom is that a higher lamellarity index talc would be expected to provide higher stiffness in a polymer composition.

In certain embodiments, the talc particulate has a specific surface area (BET) equal to or greater than about 5 $m^2/g$, for example, equal to or greater than about 8 $m^2/g$, or equal to or greater than about 10 $m^2/g$, or equal to or greater than about 10 $m^2/g$. In certain embodiments, talc particulate has a specific surface area (BET) of from about 10 $m^2/g$ to about 25 $m^2/g$, for example, from about 10 $m^2/g$ to about 20 $m^2/g$, or from about 12 $m^2/g$ to about 18 $m^2/g$, or from about 13 $m^2/g$ to about 16 $m^2/g$.

In certain embodiments, the talc particulate has a $d_{50}$ of from about 0.5 to about 5.0 μm, comprises less than about 250 ppm of particles having a particle size of equal to or greater than 45 μm, for example, equal to or less than about 100 ppm of particles having a particle size of equal to or greater than 45 μm, a steepness of from about 30 to about 40, and a lamellarity index of from about 2.8 to 4.0. In such embodiments, the talc particulate may have a $d_{95}$ of from about 8.0 to about 12.0 μm and/or a specific surface area (BET) of from about 10 $m^2/g$ to about 20 $m^2/g$.

In certain embodiments, the talc particulate has a $d_{50}$ of from about 1.5 to about 3.0 μm, comprises less than about 50 ppm of particles having a particle size of equal to or greater than 45 μm, a steepness of from about 32 to about 40, and a lamellarity index of from about 2.8 to 4.0. In such embodiments, the talc particulate may have a $d_{95}$ of from about 8.0 to about 12.0 μm and/or a specific surface area (BET) of from about 10 $m^2/g$ to about 20 $m^2/g$.

In certain embodiments, the talc particulate has a $d_{50}$ of from about 2.0 to about 3.0 μm, comprises less than about 40 ppm of particles having a particle size of equal to or greater than 45 μm, a steepness of from about 32 to about 38, and a lamellarity index of from about 3.2 to 3.8. In such embodiments, the talc particulate may have a $d_{95}$ of from about 8.0 to about 12.0 μm and/or a specific surface area (BET) of from about 10 $m^2/g$ to about 20 $m^2/g$.

In certain embodiments, the talc is the magnesium silicate mineral or the mineral chlorite, or a mixture thereof. Optionally, the talc may further include dolomite or magnesite, or combinations thereof. The amount of dolomite and/or magnesite in the talc may be less than about 10% by weight, based on the total weight of talc, for example, less than about 5% by weight, or less than about 1% by weight, or less than about 0.75% by weight, or 0.5% by weight or less, based on the total weight of talc. In certain embodiments, the talc comprises, consists essentially of, or consists of magnesium silicate mineral. In certain embodiments, the talc is a mixture of magnesium silicate mineral and chlorite. The weight ratio of magnesium silicate mineral to chlorite may be from about 5:1 to about 1:4, for example, from about 4:1 to about 1:1, or from about 4:1 to about 2:1, or from about 4:1 to about 2.5:1, or from about 4:1 to about 3:1, or about 2:1, or about 3:1, or about 4:1. In certain embodiments, the talc comprises, consists essentially of, or consists of synthetic talc or talcose.

In certain embodiments, the talc particulate may be mixed or blended with another inorganic particulate material (i.e., an inorganic particulate material other than talc), for example, an alkaline earth metal carbonate, sulphate or oxysulphate, such as calcium carbonate, magnesium carbonate, dolomite, gypsum, magnesium oxysulphate, a hydrous kandite clay such as kaolin, halloysite or ball clay, an anhydrous (calcined) kandite clay such as metakaolin or fully calcined kaolin, mica, perlite, feldspars, nepheline syenite, wollastonite, diatomaceous earth, barite, glass, and natural or synthetic silica or silicates. In certain embodiments, the talc particulate is mixed or blended with one or more of an alkaline earth metal carbonate, sulphate, or oxysulphate, mica and kaolin.

In certain embodiments, the talc particulate is treated with a surface treatment agent. Surface treatment of the talc may serve to reduce or eliminate aggregation of the talc particulates and/or enhance incorporation of the talc particulate into a polymer composition.

Suitable surface treatment agents include a compound with hydrophobic carbon chains bearing polar radicals, for example, the family of amines, silanes, siloxanes, alcohols or acids and metals salts thereof.

In certain embodiments, surface treatment agent is a polyether or a derivative thereof, for example, polyether modified polysiloxane.

In certain embodiments, the polyether is a polyoxyalkylene (POA), for example, polyalkylene glycol (PAG) or polyalkylene oxide (PAO). As used herein, the term 'polyalkylene glycol' means a POA having a number average molecular mass below 20,000 g/mol, and the term 'polyalkylene oxide' means a POA having a number average molecular mass above 20,000 g/mol. In certain embodiments, the surface treatment agent comprises or is a polyalkylene glycol having a number average molecular mass of from about 100 to about 15,000 g/mo, for example, from about 200 to about 10,000 g/mol, or from about 500 to about 9000 g/mol, or from about 1000 to about 9000 g/mol, or from about 2000 to about 900 g/mol, or from about 4000 to about 9000 g/mol, or from about 6000 to about 9000 g/mol, or from about 6000 to about 8500 g/mol.

In certain embodiments, the polyether is a polyalkylene oxide selected from one or more of paraformaldehyde (polymethylene oxide), polytetramethylene glycol, polytetramehtylene ether glycol, polyethylene oxide, polypropylene oxide, polybutylene oxide, and combinations thereof.

In certain embodiments, the surface treatment agent comprises or is polyethylene glycol. In certain embodiments, the surface treatment comprises or is a mixture of polyethylene glycol and polypropylene glycol (PPG). In certain embodiments, the surface treatment agent is polyethylene glycol having a number average molecular mass of from about 200 to about 10,000 g/mol, for example, from about 500 to about 9000 g/mol, or from about 1000 to about 9000 g/mol, or from about 2000 to about 900 g/mol, or from about 4000 to about 9000 g/mol, or from about 6000 to about 9000 g/mol, or from about 6000 to about 8500 g/mol. An exemplary PEG includes the Puriol™ range of polyglycols from BASF, for example, Puriol™ 8005.

In certain embodiments, the surface treatment agent comprise or is a fatty acid, and/or a metal salt thereof, for example, stearic acid or a metal stearate, such as magnesium, calcium or zinc stearate.

Suitable silane based agents are aminosilanes, for example, trimethoxysilyl ethyl amine, triethoxysilyl ethyl amine, tripropoxysilyl ethyl amine, tributoxysilyl ethyl amine, trimethoxysilyl propyl amine, triethoxysilyl propyl amine, tripropoxysilyl propyl amine, triisopropoxysilyl propyl amine, tributoxysilyl propyl amine, trimethoxysilyl butyl amine, triethoxysilyl butyl amine, tripropoxysilyl butyl amine, tributoxysilyl butyl amine, trimethoxysilyl pentyl amine, triethoxysilyl pentyl amine, tripropoxysilyl pentyl amine, tributoxysilyl pentyl amine, trimethoxysilyl hexyl amine, triethoxysilyl hexyl amine, tripropoxysilyl hexyl amine, tributoxysilyl hexyl amine, trimethoxysilyl heptyl amine, triethoxysilyl heptyl amine, tripropoxysilyl heptyl amine, tributoxysilyl heptyl amine, trimethoxysilyl octyl amine, triethoxysilyl octyl amine, tripropoxysilyl octyl amine, tributoxysilyl octyl amine, and the like. Suitable agents having a hydrocarbyl group and a polar group are hydrocarbyl amines such as triethanolamine (TEA), and amino alcohol agents such as 2-amino-2-methyl-1-propanol.

AMP-95® is a commercially available 2-amino-2-methyl-1-propanol formulation containing 5% water.

The surface treatment agent may be added in an amount effective to achieve the desired result. In certain embodiments, the quantity of surface treatment agent is from about 0.1% to 5% by weight with respect to the weight of talc, for example, from about 0.1% to 2% by weight with respect to the weight of talc.

Surface treatment agents may be applied by adding to the talc particulate and mixing using conventional methods. Surface treatment agents may be applied during preparation of the talc particulate from a relative coarse talc starting material and before the talc particulate is added to a polymer composition.

Preparation of Talc Particulate

The talc particulate may be prepared using techniques well known to a person of skill in the art, for example, techniques selected from comminution (e.g., crushing, grinding milling), classification (e.g., hydrodynamic selection, screening and/or sieving), and drying.

In certain embodiments, the talc particulate is prepared by a process comprising:
- (a) delaminating a liquid suspension of a relatively coarse talc particulate having an initial particle size with a $d_{50}$ of greater than about 5.0 μm, for example, greater than about 7.5 μm, and optionally having a $d_{95}$ of at least about 20.0 μm, to obtain a talc particulate having a particle size less than the initial particle size;
- (b) treating the suspension to reduce or eliminate particles having a $d_{95}$ of greater than about 15.0 μm;
- (b1) optionally treating the suspension to reduce the ppm of particles having a particle size or equal to or greater than 45 μm,
- (c) at least partially drying the suspension thereby obtaining a talc particulate having a $d_{50}$ of from about 0.5 to 5.0 μm and comprising less than about 500 ppm of particles having a particle size of equal to or greater than 45 μm.

The talc particulate may be mixed or blended with another inorganic particulate at any stage of the process.

In certain embodiment, the talc particulate obtained has one or more of the following properties.

1. A steepness of at least about 25, for example, at least about 26, or at least about 27, or at least about 28, or at least about 29. Advantageously, the talc particulate has a steepness of at least about 30, for example, at least about 31, or at least about 32, or at least about 33, or at least about 34, or at least about 35, or at least about 36, or at least about 37, or at least about 38.

2. A lamellarity index of at least about 2.6, for example, at least about 2.8, or at least about 3.0, or at least about 3.2, or at least about 3.4. In certain embodiments, the talc particulate has a lamellarity index of less than about 4.2, for equal to or less than about 4.0. In certain embodiments, the talc particulate has a lamellarity index of from about 2.8 to about 4.0, for example, from about 2.9 to about 4.0, or from about 3.0 to about 4.0, or from about 3.0 to about 2.9, or from about 3.1 to about 3.9, or from about 3.2 to about 3.9, or from about 3.3 to about 3.9.

3. A specific surface area (BET) equal to or greater than about 5 m²/g, for example, equal to or greater than about 8 m²/g, or equal to or greater than about 10 m²/g, or equal to or greater than about 10 m²/g. In certain embodiments, talc particulate has a specific surface area (BET) of from about 10 m²/g to about 25 m²/g, for example, from about 10 m²/g to about 20 m²/g, or from about 12 m²/g to about 18 m²/g, or from about 13 m²/g to about 16 m²/g.

4. Less than about 250 ppm of particles having a particle size of equal to or greater than 45 μm, for example, equal to or less than about 100 ppm, or equal to or less than about 75 ppm, or equal to or less than about 50 ppm, or equal to or less than about 40 ppm, or equal or less than about 30 ppm, or equal to or less than about 20 ppm of particles having a particle size of equal to or greater than 45 μm. In certain embodiments, the talc particulate comprises at least about 1 ppm, for example, at least about 5 ppm, or at least about 10 ppm of particles having a particle size of equal to or greater than 45 μm.

5. A $d_{50}$ of from about 0.5 to about 4.0 μm, or from about 0.5 to about 3.5 μm, or from about 0.75 to about 3.25 μm, or from about 1.0 to about 3.0 μm, or from about 1.25 to about 3.0 μm, or from about 1.5 to about 3.0 μm, or from about 1.75 to about 3.0 μm, or from about 2.0 to about 2.9 μm, or from about 2.2 to about 2.8 μm, or from about 2.3 to about 2.8 μm.

6. A $d_{95}$ of less than about 15 μm, for example, a $d_{95}$ of less than about 12 μm, less than about 11 μm, or less than about 10 μm. In certain embodiments, the talc particulate has a $d_{95}$ of from about 5.0 to about 15.0 μm, for example, from about 7.0 to about 12.0 μm, or from about 8.0 to 12.0 μm, or from about 7.0 to about 11.0 μm, or from about 8.0 to about 11.0 μm, or from about 8.0 to about 10.0 μm, or from about 8.0 to about 9.0 μm.

7. A shape factor equal to or greater than 70. In certain embodiments the talc particulate has a shape factor equal to or less than 130, for example equal to or less than 110. In certain embodiments the shape factor is from 40 to 130, or 40 to 110, or 70 to 130 or 70 to 110.

The particles having a $d_{95}$ of greater than about 15.0 μm from step (b) may be recycled for delamination according to step (a).

For treatment in step (b), the output from the delamination operation may be diluted to reduce viscosity, for example, diluted to less than about 20% by weight dry solids content, e.g., from about 5 to about 15% by weight dry solids content, or from about 10 to about 15% by weight dry solids content. The diluent may be any suitable liquid, and is typically the same liquid as that used to prepare the suspension of the relatively coarse talc particulate, e.g., water.

The talc is then at least partially dried to obtain an at least partially dried talc comprising at least about 50% by weight dry solid content, for example, from about 60% to about 90% by weight dry solid content, or from about 60 to about 80% by weight dry solid content, or from about 65 to about 75% by weight dry solid content.

The at least partially dried talc may then be broken up, i.e., particulated, which may be conducted by dry grinding in a grinder, as described above in connection with step (a), following by a further drying step to reduce the moisture content, for example, to below about 1%, which may be determined by any suitable weight analysis technique.

The process may further comprises treating the talc particulate with a surface treatment agent prior to at least partially drying the suspension to obtain an at least partially dried talc comprising at least 50% by weight dry solid content. The surface treatment agent may be incorporated during the delamination operation and/or after step (b) and prior to drying.

Polymer Compositions

The (optionally surface treated) talc particulate of the present invention may be used as a filler in a polymer composition. The talc particulate may be used as an extender filler or a functional filler. As used herein, the term "functional filler" is understood to mean an additive incorporated into a polymeric composition with a view to enhancing one or more of its physical (e.g., mechanical) properties. An "extender filler" typically modifies the properties of the polymer composition very little and essentially serves to reduce cost.

In certain embodiments, the talc particulate may be used as a functional filler in a polymer composition, for example, to modify or enhance one or more mechanical properties of the polymer composition.

In certain embodiments, the talc particulate is used as an extended filler, for example, to supplement or supplant other filler materials, which may be more expensive or more difficult to incorporate into the polymer composition.

In certain embodiments, the polymer composition comprises from about 5 to about 70% by weight of (optionally surface treated) talc particulate, based on the total weight of the polymer composition, for example, from about 10 to about 70% by weight, or from about 20 to about 60% by weight, or from about 25 to about 50% by weight, or from about 30 to about 50% by weight, or from about 30 to about 45% by weight, or from about 30 to about 40% by weight, or from about 35 to about 45% by weight of talc particulate. In certain embodiments, the polymer composition comprises at least about 10% by weight of talc particulate, based on the total weight of the polymer composition, for example, at least about 20% by weight, or at least about 25% by weight, or at least about 30% by weight, or at least about 35% by weight, or at least about 40% by weight of talc particulate.

The polymer composition may comprise filler other than the talc particulate including, but not limited to, an alkaline earth metal carbonate or sulphate, such as calcium carbonate, magnesium carbonate, dolomite, gypsum, a hydrous kandite clay such as kaolin, halloysite or ball clay, an anhydrous (calcined) kandite clay such as metakaolin or fully calcined kaolin, mica, perlite, feldspars, nepheline syenite, wollastonite, diatomaceous earth, barite, glass, and natural or synthetic silica or silicates. In certain embodiments, the polymer composition may comprise a talc other than the talc particulate of the present invention.

The filler compounds other than the talc particulate may be included during preparation of the polymer composition, or alternatively, during preparation of the talc particulate, e.g., the talc particulate may be mixed and blended with the other filler compound(s), optionally combined with surface treatment agent. In such embodiments, the other filler compound(s) may be surface treated with the surface treatment agent.

In certain embodiments, the amount of other filler compound(s) is present in amount less than about 10% by weight, based on the total weight of the polymer composition, for example, less than about 5% by weight, or less than about 1% by weight, or less than about 0.5% by weight, or less than about 0.4% by weight, or less than about 0.3% by weight, or less than about 0.2% by weight, or less than about 0.1% by weight.

The polymer composition may comprise any natural or synthetic polymer or mixture thereof. The polymer may, for example, be thermoplastic or thermoset. The term "polymer" used herein includes homopolymers and/or copolymers, as well as crosslinked and/or entangled polymers.

The term "precursor" as may be applied to the polymer component will be readily understood by one of ordinary skill in the art. For example, suitable precursors may include one or more of: monomers, cross-linking agents, curing systems comprising cross-linking agents and promoters, or any combination thereof. Where, according to the present invention, the talc particulate is mixed with precursors of the polymer, the polymer composition will subsequently be formed by curing and/or polymerising the precursor components to form the desired polymer.

Polymers, including homopolymers and/or copolymers, comprised in the polymer composition of the present invention may be prepared from one or more of the following monomers: acrylic acid, methacrylic acid, methyl methacrylate, and alkyl acrylates having 1-18 carbon atoms in the alkyl group, styrene, substituted styrenes, divinyl benzene, diallyl phthalate, butadiene, vinyl acetate, acrylonitrile, methacrylonitrile, maleic anhydride, esters of maleic acid or fumaric acid, tetrahydrophthalic acid or anhydride, itaconic acid or anhydride, and esters of itaconic acid, with or without a cross-linking dimer, trimer, or tetramer, crotonic acid, neopentyl glycol, propylene glycol, butanediols, ethylene glycol, diethylene glycol, dipropylene glycol, glycerol, cyclohexanedimethanol, 1,6 hexanediol, trimethyolpropane, pentaerythritol, phthalic anhydride, isophthalic acid, terephthalic acid, hexahydrophthalic anyhydride, adipic acid or succinic acids, azelaic acid and dimer fatty acids, toluene diisocyanate and diphenyl methane diisocyanate.

The polymer may be selected from one or more of polymethylmethacrylate (PMMA), polyacetal, polycarbonate, polyvinyls, polyacrylonitrile, polybutadiene, polystyrene, polyacrylate, polyethylene, polypropylene, epoxy polymers, unsaturated polyesters, polyurethanes, polycyclopentadienes and copolymers thereof. Suitable polymers also include liquid rubbers, such as silicones.

The polymers which may be used in accordance with the invention are advantageously thermoplastic polymers. Thermoplastic polymers are those which soften under the action of heat and harden again to their original characteristics on cooling, that is, the heating-cooling cycle is fully reversible. By conventional definition, thermoplastics are straight and branched linear chain organic polymers with a molecular bond. Examples of polymers which may be used in accordance with the invention include, but are not limited to polyethylene, for example, linear low density polyethylene (LLDPE) and medium density grades thereof, high density polyethylene (HDPE), low density polyethylene (LDPE), polypropylene (PP), polyethylene terephthalate (PET), vinyl/polyvinyl chloride (PVC), polystyrene, and mixtures thereof.

In certain embodiments, the polymer is a polyalkylene polymer, for example, polyethylene, polypropylene, polybutylene, or a copolymer of two or more of ethylene, propylene and butylenes monomers, for example, an ethylene-propylene copolymer. In certain embodiments, the polymer is a mixture of two or more of propylene, polyethylene and ethylene-propylene copolymer, for example a mixture of propylene and polyethylene.

In certain embodiments, the polymer comprises, consists essentially of, or consists of polypropylene or polyethylene or a mixture of polypropylene and polyethylene.

Preparation of Functional Composition

The polymer composition can be prepared by mixing of the components thereof intimately together. The talc particulate may then be suitably blended, e.g., dry blended, with the mixture of components and any desired additional components, before processing to form an a final polymer composite or article.

The polymer composition may be prepared by combining talc particulate, as described herein, with a polymer in amount of at least about 1% by weight, based on the total weight of the polymer composition, for example, in an amount of at least about 2% by weight, or least about 3% by weight, or at least about 5% by weight, or at least about 10% by weight, or at least about 15% by weight, or at least about 20% by weight, or at least about 30% by weight, or at least about 35% by weight, or at least about 40% by weight, or at least about 45% by weight, or at least about 50% by weight, or at least about 60% by weight, based on the total weight of the polymer composition. In certain embodiments, the amount of talc particulate is from about 1 to about 70% by weight, based on the total weight of the polymer composition, for example, from about 5 to about 70% by weight, or from about 10 to about 70% by weight, or from about 20 to about 60% by weight, or from about 25 to about 50% by weight, or from about 30 to about 50% by weight, or from about 30 to about 45% by weight, or from about 30 to about 40% by weight, or from about 35 to about 45% by weight, based on the total weight of the polymer composition.

In certain embodiments, the polymer composition comprises at least about 30% by weight polymer, based on the total weight of the polymer composition, for example, from about 30 to about 90% by weight polymer, or from about 40 to about 80% by weight polymer, from about 50 to 75% by weight polymer, from about 50 to about 70% by weight polymer, or from about 55 to about 70% by weight polymer, or from about 60 to about 70% by weight polymer, or from about 55 to 65% by weight polymer, based on the total weight of the polymer composition.

Preparation of the polymer compositions of the present invention can be accomplished by any suitable mixing method known in the art, as will be readily apparent to one of ordinary skill in the art.

Such methods include dry blending of the individual components or precursors thereof and subsequent processing in a conventional manner. Certain of the ingredients can, if desired, be pre-mixed before addition to the compounding mixture.

In the case of thermoplastic polymer compositions, such processing may comprise melt mixing, either directly in an extruder for making an article from the composition, or pre-mixing in a separate mixing apparatus. Dry blends of the individual components can alternatively be directly injection moulded without pre-melt mixing.

The polymer composition can be prepared by mixing of the components thereof intimately together. The talc particulate may then be suitably dry blended with the polymer and any desired additional components, before processing as described above.

Other filler compounds, may be added and blended in at the mixing stage.

For the preparation of cross-linked or cured polymer compositions, the blend of uncured components or their precursors, and, if desired, the talc particulate and any desired non-talc component(s), will be contacted under suitable conditions of heat, pressure and/or light with an effective amount of any suitable cross-linking agent or curing system, according to the nature and amount of the polymer used, in order to cross-link and/or cure the polymer.

For the preparation of polymer compositions where the talc particulate and any desired other component(s) are present in situ at the time of polymerisation, the blend of monomer(s) and any desired other polymer precursors, talc particulate and any other component(s) will be contacted under suitable conditions of heat, pressure and/or light, according to the nature and amount of the monomer(s) used, in order to polymerise the monomer(s) with the talc particulate and any other component(s) in situ.

In certain embodiments, the talc particulate is dispersed with agitation into a mixture comprising polymer (for example, polypropylene) and optionally a curing agent. The mixture may further comprise a mould release agent.

The resulting dispersion can be degassed to remove entrained air. The resulting dispersion can then be poured into a suitable mould and cured. Suitable curing temperatures range from 20-200° C., for example 20-120° C., or, for example, 60-90° C.

The starting polymer mixture can further comprise a pre-polymer (for example, propylene monomer). The pre-polymer may or may not correspond to the starting polymer.

The viscosity of the starting polymer or polymer/monomer solution, amount of curing agent, release agent and surface treated high aspect ratio talc can be varied according to the requirements of the final cured product. Generally, the greater the amount of talc particulate added, the higher the viscosity of the dispersion. Dispersant agents can be added to reduce the viscosity of the dispersion. Alternatively, the amount of polymer in the starting solution can be reduced.

Suitable curing agents will be readily apparent to one of ordinary skill in the art, and include organic peroxides, hydroperoxides and azo compounds. Examples of peroxide and hydroperoxide curing agents include dimethyl dibutylperoxyhexane, benzyl peroxide, dicumyl peroxide, methyl ethyl ketone peroxide, lauryl peroxide, cyclohexanone peroxide, t-butyl perbenzoate, t-butyl hydroperoxide, t-butyl benzene hydroperoxide, cumene hydroperoxide and t-butyl peroctoate.

The compounded compositions may further comprise additional components, such as slip aids (for example Erucamide), process aids (for example Polybatch® AMF-705), mould release agents and antioxidants.

Suitable mould release agents will be readily apparent to one of ordinary skill in the art, and include fatty acids, and zinc, calcium, magnesium and lithium salts of fatty acids and organic phosphate esters. Specific examples are stearic acid, zinc stearate, calcium stearate, magnesium stearate, lithium stearate calcium oleate, zinc palmitate. Typically, slip and process aids, and mould release agents are added in an amount less than about 5 wt. % based on the weight of the masterbatch. Polymer articles, including those described above, may then be extruded, compression moulded or injected moulded using conventional techniques known in the art, as will be readily apparent to one of ordinary skill in the art. Thus, as described below, the present invention is also directed to articles formed from the polymer compositions of the present invention.

In certain embodiments, the polymer composition comprises a colorant which, if present, will be added during compound of the polymer composition. The colorant may be added in the form of a masterbatch. Suitable colours are many and various.

In certain embodiments, talc particulate is added to a twin-screw extruder to which unfilled polymer is being fed and made molten. The talc particulate is fed into the extruder through a hopper, for example, via gravimetric feeding, and uniformly blends with the polymer. The mixture emerges from the extruder and may be cooled. Then, for example, the mixture can be further compression moulded or injection moulded into useful shapes.

The methods described above may include compounding and extrusion. Compounding may be carried out using a twin screw compounder, for example, a Clextral BC 21 double screw extruder or a Leistritz ZSE 18 double screw extruder or Baker Perkins 25 mm twin screw compounder. The polymer, talc particulate and optional additional components may be premixed and fed from a single hopper. The resulting melt may be cooled, for example, in a water bath, and then pelletized. Test pieces, e.g., charpy bars or tensile dumbbells, may be injection moulded or cast or blown into film.

The screw temperature may be between about 100° C. and about 300° C., for example, between about 150° C. and about 280° C., for example, between about 180° C. and about 250° C., or between about 200 and 230° C.

Screw speed may be between about 100 and 1200 rpm, for example, between about 100 and 1000 rpm, for example, between about 200 and 800 rpm, for example, between about 250 and 650 rpm, for example, between about 200 and 400 rpm, or between about 500 and 700 rpm. In certain embodiments, screw speed is about 300 rpm. In other embodiments, screw speed is about 600 rpm.

Suitable injection molding apparatus includes, for example, a Billion 50T Proxima press. The polymer composition may be dried prior to molding. Drying may be carried out at any suitable temperature, for example, about 60° C., for a suitable period of time, for example, between about 1 hours and 20 hours, for example, between about 2 and 18 hours, or between about 1 and 3 hours, or between about 4 and 8 hours, or between about 12 and 18 hours. The temperature during drying may be kept constant or varied. In certain embodiments, the temperature during drying is between about 70 and 120° C., for example, between about 80 and 100° C., for example, about 90° C.

Molding is generally conducted at a temperature at which the polymer composition is flowable. For example, the molding temperature may be between about 100 and 300° C., for example, between about 200 and 300° C., or between about 240 and about 280° C. Following molding the molded piece will be allowed to cool and set.

Other suitable processing techniques include gas-assisted injection molding, calendaring, vacuum forming, thermoforming, blow-molding, drawing, spinning, film forming, laminating or any combination thereof. Any suitable apparatus may be used, as will be apparent to one of ordinary skill in the art.

The polymer composition can be processed to form, or to be incorporated in, articles of commerce in any suitable way, as described herein. The articles which may be formed from the polymer composition are many and various. Examples include automotive body parts and panels, for example, a bonnet (hood), wing piece, wing-mirror casing, door (front and/or rear), tail gate and bumper (front and/or rear).

In certain embodiments, the polymer compositions and/or polymer composites and/or of the present invention may be characterised in terms of a physical or mechanical property or properties.

In certain embodiments, polymer compositions and/or polymer composites and/articles formed therefrom may be characterized in terms of impact properties, also referred to as impact strength, for example, Charpy impact strength or falling weight index (FWI). These properties may be determined in accordance with the methods described in the Examples below. In certain embodiments, the polymer composition and/or polymer composite and/or article formed therefrom, comprising an amount of talc particulate (e.g., at least about 2% by weight, or at least about 5% by weight, or at least about 10% by weight, or at least about 15% by weight, or at least about 20% by weight, or at least about 30% by weight, or at least about 35% by weight, or at least about 40% by weight) may have Charpy impact strength and/or a FWI (at 0° C. or 20° C.) which is comparable to, or improved relative to, a polymer composition and/or polymer composite and/or article formed therefrom, comprising a comparable amount of a talc particulate that comprises greater than 500 ppm of particles having a particle size of equal to or greater than 45 µm, for example, a comparable amount of a talc particulate that comprises greater than 1000 ppm of particles having a particle size of equal to or greater than 45 µm. For instance, in certain embodiments the Charpy impact strength may be improved by at least 1%, or at least 2%, or at least 3%, or at least 4%, or at least 5%, or at least 10%, or at least 15%, or at least 20% relative to, a polymer composition and/or polymer composite and/or article formed therefrom, comprising a comparable amount of talc particulate that comprises greater than 500 ppm of particles having a particle size of equal to or greater than 45 µm. In other embodiments, the FWI may be improved by at least 1%, or at least 2%, or at least 3%, or at least 4%, or at least 5%, or at least 10%, or at least 15%, or at least 20% relative to, a polymer composition and/or polymer composite and/or article formed therefrom, comprising a comparable amount of talc particulate that comprises greater than 500 ppm of particles having a particle size of equal to or greater than 45 µm.

In certain embodiments, polymer compositions and/or polymer composites and/articles formed therefrom may be characterized in terms of a stiffness property, for example, flexural modulus. This property may be determined in accordance with the methods described in the Examples below. In certain embodiments, the polymer composition and/or polymer composite and/or article formed therefrom, comprising an amount of talc particulate (e.g., at least about 2% by weight, or at least about 5% by weight, or at least about 10% by weight, or at least about 15% by weight, or at least about 20% by weight, or at least about 30% by weight, or at least about 35% by weight, or at least about 40% by weight) may have a flexural modulus which is comparable to, or improved relative to, a polymer composition and/or polymer composite and/or article formed therefrom, comprising a comparable amount of talc particulate that comprises greater than 500 ppm of particles having a particle size of equal to or greater than 45 µm, for example, a comparable amount of a talc particulate that comprises greater than 1000 ppm of particles having a particle size of equal to or greater than 45 µm. For instance, in certain embodiments the flexural modulus may be improved by at least 1%, or at least 2%, or at least 3%, or at least 4%, or at least 5%, or at least 10%, or at least 15%, or at least 20% relative to, a polymer composition and/or polymer composite and/or article formed therefrom, comprising a comparable amount of talc particulate that comprises greater than 500 ppm of particles having a particle size of equal to or greater than 45 µm.

For the avoidance of doubt, the present invention also embraces the following subject-matter as defined in the following numbered paragraphs.

1. A talc particulate having a d50 of from about 0.5 to 5.0 µm and comprising less than about 500 ppm of particles having a particle size of equal to or greater than 45 µm and a lamellarity index of from about 2.8 to about 45.0.

2. The talc particulate according to paragraph 1 comprising less than about 250 ppm of particles having a particle size of equal to or greater than about 45 µm.

3. The talc particulate according to paragraph 2 comprising equal to or less than about 100 ppm of particles having a particle size of equal to or greater than about 45 µm.

4. The talc particulate according to paragraph 3 comprising equal to or less than about 50 ppm of particles having a particle size of equal to or greater than about 45 µm.

5. The talc particulate according to any preceding paragraph having a steepness of equal to or greater than about 30.0.

6. The talc particulate according to any preceding paragraph having a lamellarity index of from about 2.8 to about 5.0.

7. The talc particulate according to any preceding paragraph having a shape factor equal to or greater than 40, and optionally no greater than 150, or 70-150 or 70-130.

8. The talc particulate according to any preceding paragraph having a d95 of from about 5.0 to about 15.0 μm, for example, from about 8.0 to about 12.0 μm.

9. The talc particulate according to any preceding paragraph having a specific surface area (BET) of from about 10 m²/g to about 20 m²/g.

10. The talc particulate according to any preceding paragraph which is surface treated with a surface treatment agent.

11. A process for preparing a talc particulate having a d50 of from about 0.5 to 5.0 μm and a lamellarity index of from about 2.8 to about 20.0, for example, from about 2.8 to about 5.0, and comprising less than about 500 ppm of particles having a particle size of equal to or greater than 45 μm, said process comprising:
  (a) delaminating a liquid suspension of a relatively coarse talc particulate having an initial particle size with a d50 of greater than about 5.0 μm, for example, greater than about 7.5 μm, and optionally having a d95 of at least about 20.0 μm, to obtain a talc particulate having a particle size less than the initial particle size;
  (b) treating the suspension to reduce or eliminate particles having a d95 of greater than about 15.0 μm; and
  (c) at least partially drying the suspension, thereby obtaining a talc particulate having a d50 of from about 0.5 to 5.0 μm and a lamellarity index of from about 2.8 to about 20.0, for example, from about 2.8 to about 5.0, and comprising less than about 500 ppm of particles having a particle size of equal to or greater than 45 μm.

12. The process according to paragraph 11, further treating the talc particulate with a surface treatment agent prior to at least partially drying the suspension.

13. The process according to paragraph 11 or 12, wherein at least a portion of the particles having a d95 of greater than about 15.0 μm is recycled for delamination according to step (a).

14. A polymer composition comprising the talc particulate according to any one of paragraphs 1-9, or obtainable by the process according to any one of paragraphs 11-13.

15. The polymer composition according to paragraph 14, wherein the polymer is selected from polypropylene, polyethylene, a propylene-ethylene copolymer, or combinations thereof.

16. The polymer composition according to any one of paragraphs 14-15, comprising at least about 1% by weight of the talc particulate, based on the total weight of the polymer composition.

17. A process for preparing a polymer composition comprising combining talc particulate according to any one of paragraphs 1-10, or obtainable by the process according to any one of paragraphs 11-13, with a polymer.

18. A polymer composite or article formed from, for example, extruded or molded, from the polymer composition of any one of paragraphs 14-17.

19. The polymer composite or article according to paragraph 18 having:
  (i) a first Charpy impact strength which is greater than a second Charpy impact strength of a comparable polymer composite or article comprising the same amount of talc particulate talc that comprises greater than 500 ppm of particles having a particle size of equal to or greater than 45 μm; and/or
  (ii) a first falling weight index (FWI) at 0° C. or 20° C. which is greater than a second FWI of a comparable polymer composite or article comprising the same amount of talc particulate that comprises greater than 500 ppm of particles having a particle size of equal to or greater than 45 μm; and/or
  (iii) a first flexural modulus which is greater than a second flexural modulus of a comparable polymer composite or article comprising the same amount of talc particulate that comprises greater than 500 ppm of particles having a particle size of equal to or greater than 45 μm.

20. Use of a talc particulate according to any one of paragraphs 1-10, or obtainable by the process according to any one of paragraphs 11-13 as a filler, for example, a functional filler, in a polymer composition.

The invention will now be illustrated, by reference to the following non-limiting examples.

EXAMPLES

Unless otherwise specified, the following test methods were used to characterise the materials prepared in the Examples:

Flexural Modulus (MPa)

Measured on 80 mm by 10 mm by 4 mm bars according to ISO 178.

Charpy Impact Strength KJ/m

Measured on 80 mm by 10 mm by 4 mm bars according to ISO 178. Unnotched samples at −20° C./−10° C./0° C.; notched samples at 23° C.

Falling Weight Index (J) at 0° C. and −20° C.

Measured on 60*60*3 mm plaques according to EN ISO 6603:2.

"Lamellarity Index" and "Shape Factor"

As described above

Example 1

A fine talc particulate having properties as summarized in Table 1 was prepared.

The fine talc particulate was compounded with a polypropylene copolymer and then test pieces were extruded for testing. Mechanical properties are given in Table 1.

Comparative Example A

For comparison purposes, a comparative talc particulate was prepared having properties as summarized in Table 1.

The comparative talc particulate was compounded with the same polypropylene copolymer as used in Example 1. Mechanical properties are give in Table 1.

TABLE 1

| | | | | Comp. A | Ex. 1 |
|---|---|---|---|---|---|
| Granulometry | sedigraph | D95 | μm | 13.2 | 8.7 |
| | | D70 | μm | 4.0 | 3.7 |
| | | D50 | μm | 2.2 | 2.4 |
| | | D30 | μm | 1.0 | 1.3 |
| | laser | D95 | μm | 35.7 | 27.2 |
| | | D50 | μm | 11.4 | 10.7 |

TABLE 1-continued

|  |  | Comp. A | Ex. 1 |
|---|---|---|---|
| Specific surface (m$^2$/g) | m$^2$/g | 16.6 | 15.7 |
| Particles at ≥45 μm | ppm | >1000 | 26 |
| Lamellarity Index |  | 4.2 | 3.5 |
| Shape Factor |  | 100 | 93 |
| steepness 100 * d30/d70 |  | 25 | 35 |
| Properties of compounded PP |  |  |  |
| Flexural Modulus | MPa | 3005 | 3085 |
| Charpy Impact | kJ/m$^2$ | 30 | 33 |

The invention claimed is:

1. A processed talc particulate having a $d_{50}$ of from about 0.5 to 5.0 μm, having a shape factor equal to or greater than about 40, having a $d_{95}$ from 7.0 to 12.0 μm, having a steepness equal to or greater than 30.0, and comprising less than about 500 ppm of particles having a particle size of equal to or greater than 45 μm.

2. The talc particulate according to claim 1 comprising less than about 250 ppm of particles having a particle size of equal to or greater than about 45 μm.

3. The talc particulate according to claim 1 having:
a lamellarity index of from about 2.8 to about 45.0, and
a shape factor equal to or greater than 70 and no greater than 150.

4. The talc particulate according to claim 3 having a specific surface area (BET) of from about 10 m$^2$/g to about 20 m$^2$/g.

5. The talc particulate according to claim 4 which is surface treated with a surface treatment agent.

6. The talc particulate according to claim 1 having a lamellarity index of from about 2.8 to about 45.0.

7. The talc particulate according to claim 1 having a shape factor equal to or greater than 70 and no greater than 150.

* * * * *